United States Patent

Whitmer, Sr.

[11] Patent Number: 5,752,835
[45] Date of Patent: May 19, 1998

[54] MOBILE FIRE FIGHTING TRAINING FACILITY

[76] Inventor: Michael A. Whitmer, Sr., 3540 SW. Pryor Rd., Lee's Summit, Mo. 64082

[21] Appl. No.: 835,485

[22] Filed: Apr. 8, 1997

[51] Int. Cl.⁶ .................................... G09B 19/00
[52] U.S. Cl. ........................................ 434/226
[58] Field of Search ................................ 434/226

[56] References Cited

U.S. PATENT DOCUMENTS

| | | |
|---|---|---|
| 1,327,248 | 1/1920 | Moody . |
| 4,001,949 | 1/1977 | Francis . |
| 4,526,548 | 7/1985 | Livingston . |
| 4,958,874 | 9/1990 | Hegedus . |
| 4,998,479 | 3/1991 | Perham et al. . |
| 5,173,052 | 12/1992 | Duncan, Jr. . |
| 5,203,707 | 4/1993 | Musto et al. ............ 434/226 |
| 5,280,985 | 1/1994 | Morris . |
| 5,316,480 | 5/1994 | Ellsworth . |
| 5,316,484 | 5/1994 | Layton et al. . |
| 5,415,551 | 5/1995 | Semenza ................ 434/226 |

FOREIGN PATENT DOCUMENTS 0146465   6/1985   European Pat. Off. ........... 434/226

*Primary Examiner*—Jeffrey A. Smith
*Attorney, Agent, or Firm*—Hovey,Williams,Timmons & Collins

[57] ABSTRACT

A mobile fire fighting training facility (10) that can be easily transported to a training site and that more realistically simulates an actual fire is disclosed. The fire training facility includes a mobile housing (12) having a plurality of exterior walls (18,20,22,24,26) and an interior chamber 28, fire generating means (32) coupled with the housing for generating a fire in the interior chamber of the housing, and a plurality of foldable extension panels (50,52,54) attached to the exterior of the housing. The outer surface of each foldable panel resembles a portion of the exterior or facade of a stationary building such as a house. The foldable panels are shiftable between folded, transport positions wherein the panels overlie a portion of exterior walls of the housing and extended, use positions wherein the panels are positioned adjacent to and substantially coplanar with one of the exterior walls of the housing.

12 Claims, 2 Drawing Sheets

MOBILE FIRE FIGHTING TRAINING FACILITY

BACKGROUND OF THE INVENTION

1. Field of the Invention

The present invention relates to fire fighting training facilities. More particularly, the invention relates to a mobile fire fighting training facility that can be easily transported and that more closely simulates an actual fire.

2. Description of the Prior Art

Fire departments often use fire training facilities for training their firefighters. These training facilities typically include fire and smoke generators positioned in fire-resistant structures. Such training facilities are typically large and positioned in permanent, stationary buildings; therefore, firefighters must travel to the facilities. Unfortunately, this is sometimes impractical for firefighters who live long distances from such facilities or who cannot take time off of their jobs. This is especially true for small fire departments that have no back-up firefighters who can fight fires while the primary firefighters are gone.

To train firefighters who are remote from such stationary facilities, mobile fire training facilities have been developed. These mobile training facilities typically consist of a mobile home or trailer that has been equipped with portable fire and smoke generators.

Although these mobile training facilities permit the training of firefighters in remote areas, they do not realistically simulate common fire situations because they resemble mobile homes rather than stationary buildings such as houses. Since most actual fires occur in stationary buildings rather than mobile homes, the use of these mobile fire training facilities cannot accurately simulate an actual burning house. Those skilled in the art will appreciate that it is important to simulate fires with as much realism as possible to properly train firefighters.

OBJECTS AND SUMMARY OF THE INVENTION

In view of the foregoing, it is an object of the present invention to provide a mobile fire training facility that more realistically simulates common fire situations.

More particularly, it is an object of the present invention to provide such a mobile fire training facility that resembles a burning house or other stationary building but that remains easy to transport.

The present invention achieves these objects and other objects that become evident from the description of the preferred embodiments of the invention by providing a fire training facility that is mobile and that more accurately simulates an actual burning house. The fire training facility of the present invention broadly includes a mobile housing having a plurality of exterior walls defining an interior chamber; fire generating means coupled with the housing for generating a fire in the interior chamber of the housing; and at least one foldable, extension panel attached to the exterior of the housing.

The foldable extension panel is shiftably mounted to the housing between a folded, transport position wherein the panel overlies a portion of one of the exterior walls of the housing and an extended, use position wherein the panel is positioned adjacent to and substantially coplanar with another one of the exterior walls of the housing. The foldable panel includes at least one surface resembling a portion of a facade or exterior of a stationary building such as a house.

When the fire training facility is in use, the foldable extension panel is shifted to its extended use position so that the mobile housing resembles a burning stationary building. Then, when the training session has been completed, the foldable extension panel is shifted to its folded, transport position so that the training facility can be more easily transported to a new location.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
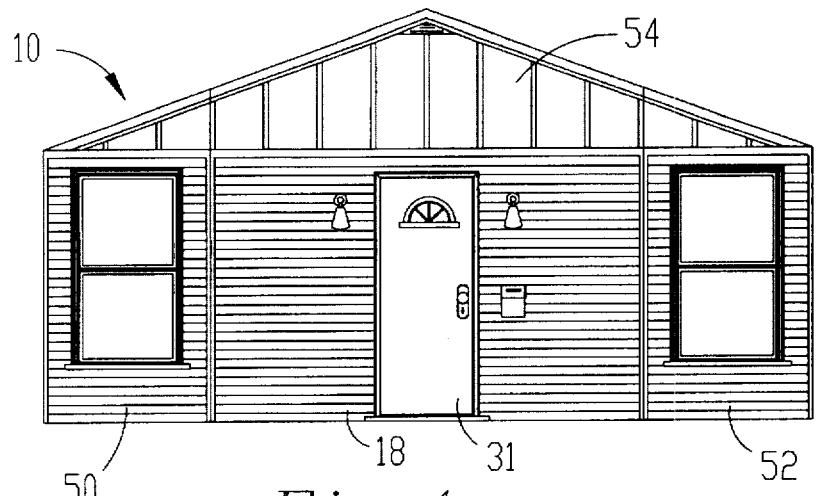
FIG. 1 is a front view of a fire fighting training facility constructed in accordance with a preferred embodiment of the invention showing the foldable extension panels of the facility in their extended, use positions.
Figure 2:
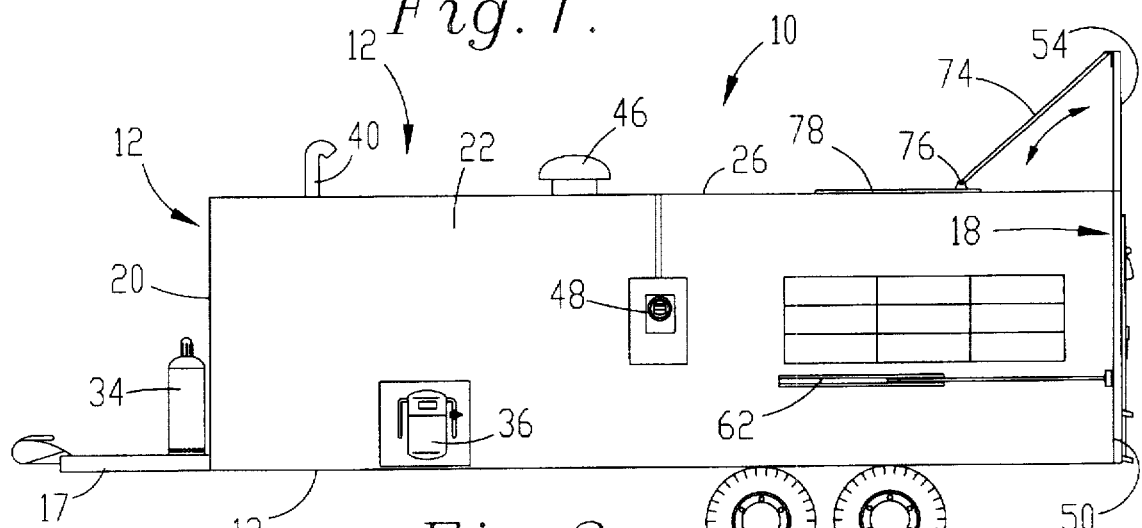
FIG. 2 is a left side view of the fire fighting training facility.

Turning now to the drawing figures, a fire fighting training facility 10 constructed in accordance with a preferred embodiment of the invention is illustrated. The fire fighting training facility 10 broadly includes a mobile housing 12, fire simulating equipment generally referred to by the numeral 14 for simulating an actual fire in the housing, and at least one foldable extension panel attached to one end of the mobile housing that resembles a portion of a stationary, permanent building such as a house or office.

In more detail, the mobile housing 12 is preferably a conventional mobile home or trailer having a support frame 13 supported on a plurality of ground engaging wheels 15. One end of the support frame 12 has a tongue 17 extending therefrom for coupling with a towing vehicle to permit towing of the housing.

Figure 4:
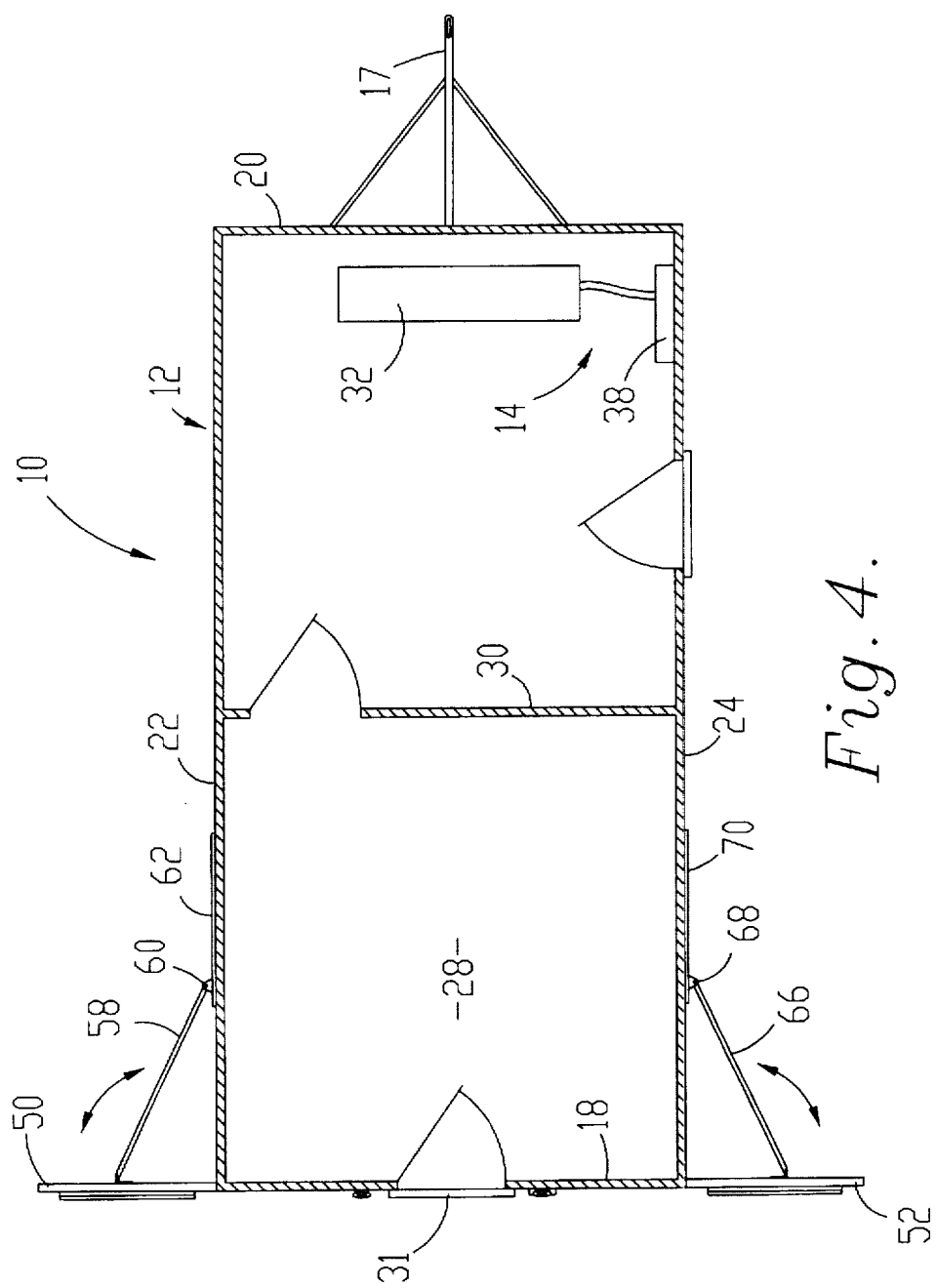
FIG. 4 is a top section view of the fire fighting training facility shown with the top of the housing removed to illustrate the interior chamber of the housing.

The mobile housing 12 also includes opposed front and rear walls 18, 20, left and right side walls 22, 24, and a top wall 26 supported on the support frame 12. As illustrated in FIG. 4, the walls define an interior chamber 28 that is subdivided into at least two interior rooms by an interior wall 30. The front wall 18 preferably has an exterior doorway 31 therein leading to one of the interior rooms.

Fire may be generated in the housing by a fire box 32 that is positioned in one of the interior rooms. The fire box 32 preferably has at least one gas burner that is coupled with a propane gas tank 34 positioned on the tongue 17 of the frame 13. The training facility 10 may also include gas piping leading from the propane gas tank 34 to a natural gas meter 36 so a simulated fire at the meter can be conducted.

The fire box 32 is preferably controlled by a fire control panel 38 attached to the housing. One or more vents 40 is positioned through the top wall 26 of the housing immediately above the fire box 32 for venting the gas fumes from the fire box out of the housing.

Figure 3:
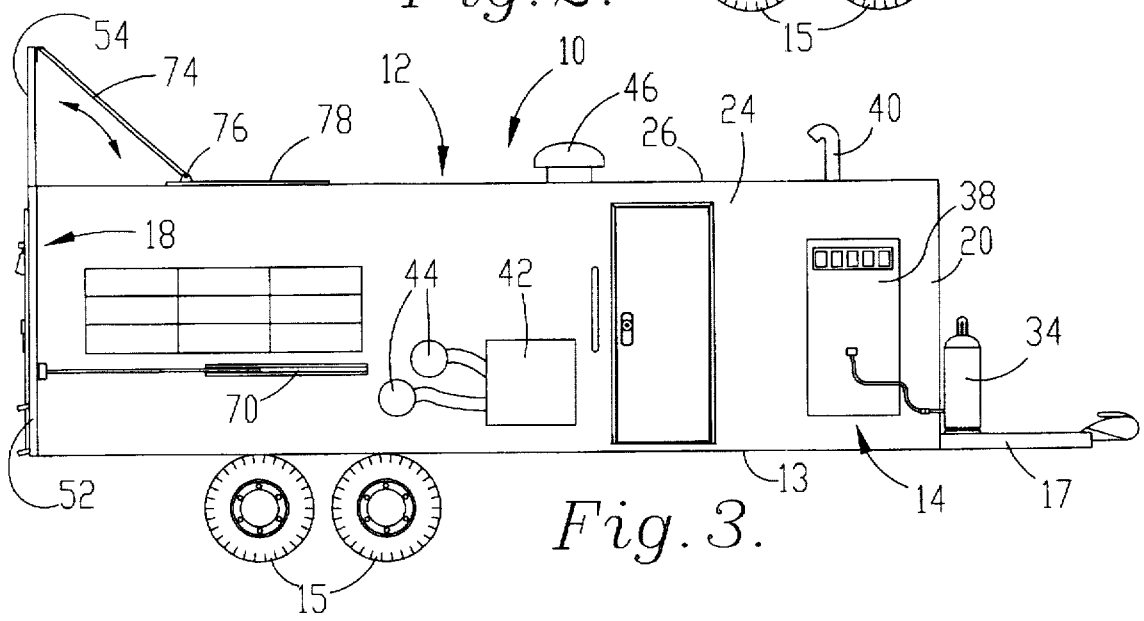
FIG. 3 is a right side view of the fire fighting training facility.

As best illustrated in FIG. 3, the facility 10 may also include a conventional smoke generator 42 that generates and delivers smoke to the interior chamber 28 through a pair of vents 44 that extend through one of the side walls 22, 24 of the housing. In emergencies or after a training session has been completed, the smoke may be cleared from the housing by a powered exhaust vent 46 positioned through the top wall 26 of the housing. Power is delivered to the smoke generator 42 as well as the powered exhaust vent 46 by an extension cord ran to a conventional outlet. A mock electric panel and meter 48 may be mounted to the facility 10 for simulation purposes.

In accordance with the present invention, the fire training facility 10 includes a plurality of extension panels 50, 52, 54 attached to the exterior of the housing. The extension panels 50, 52, 54 are preferably manufactured of fire resistant material such as metal and each has a surface that resembles a portion of the front or facade of a stationary building such as a house or office.

As indicated by the arrows in FIGS. 3 and 4, the panels 50, 52, 54 are shiftable between folded, transport positions and extended, use positions. As illustrated in FIG. 1, when the panels 50, 52, 54 are shifted to their extended, use positions, the front wall 18 of the housing resembles a conventional house.

In preferred forms, the first panel 50 has a front surface having a design of a window and a portion of a roof painted thereon so that the panel resembles the left side of a conventional, stationary house. The right side margin of the first panel 50 is hingedly connected to the left side margin of the front wall 18 of the housing as illustrated in FIG. 4.

To facilitate the shifting movement of the first panel 50, one end of an elongated support rod 58 is hingedly attached to the rear surface of the first panel. The other end of the support rod is attached to a slide member 60 that is received within a guide track 62 attached to the left side wall 22 of the housing. The slide member 60 slides along the length of the guide track 62 when the first panel is shifted between its folded and extended positions. The frontmost portion of the guide track serves as a stop to limit the travel of the first panel when it is shifted to its extended position to prevent it from extending beyond the plane of the front wall 18.

When the first panel 50 is positioned in its folded, transport position, it extends substantially perpendicular to the front wall 18 and overlies a portion of the left side wall 22 of the housing so that it is substantially flush with the left side wall 22. However, when the first panel 50 is positioned in its extended, use position, it extends substantially parallel to and generally coplanar with the front wall of the housing as best illustrated in FIGS. 1 and 4.

The second foldable extension panel 52 also preferably has a front surface having a design of a window and a portion of a roof painted thereon so that the panel resembles the right side of a conventional, stationary house or office. The left side margin of the second panel 52 is hingedly connected to the right side margin of the front wall 18. Similar to the first panel 50, the second panel 52 is supported for shifting movement by an elongated support rod 66 hingedly attached between the rear surface of the second panel and a slide member 68 that is positioned in a guide track 70 attached to the right side wall 24 of the housing.

When the second panel 52 is positioned in its folded, transport position, it extends substantially perpendicular to the front wall 18 and overlies a portion of the right side wall 24 of the housing so that it is generally flush with the right side wall 24. However, when the second panel is positioned in its extended, use position, it extends substantially parallel to and generally coplanar with the front wall of the housing.

The third foldable panel 54 preferably has a front surface having a design painted thereon that resembles the roof line of a conventional, stationary house. The bottom margin of the third panel 54 is hinged to the top margin of the front wall 18. Similar to the first and second panels 50, 52, the third panel 54 is supported for shifting movement by an elongated support rod 74 hingedly attached between the rear surface of the third panel and a slide member 76 that is positioned in a guide track 78 attached to the top wall 26 of the housing.

When the third panel 54 is positioned in its folded, transport position, it extends substantially perpendicular to the front wall 18 of the housing and overlies a portion of the top wall 26 so that it is generally flush with the top wall 26. However, when the third panel 54 is positioned in its extended, use position, it extends substantially parallel to and generally coplanar with the front wall of the housing.

The first and second panels 50,52 are preferably each approximately six feet wide, and the third panel 54 is preferably eight feet wide. When, the panels 50,52,54 are attached to a mobile home that is eight feet wide, the panels 50,52,54 and front wall 18 of the mobile housing span twenty feet when the panels are extended.

In use, the panels 50, 52, 54 are initially positioned in their folded, transport positions so that the fire training facility 10 can be easily transported to a training site. Once the fire training facility has been transported, the panels 50, 52, 54 are shifted to their extended, use positions so that the front wall 18 of the mobile housing resembles a house or other stationary building as illustrated in FIG. 1. Fire and smoke is then generated in the interior of the mobile housing by the fire box 32 and smoke generator 42 to simulate an actual burning house. Firefighters may then enter the front door 31 of the mobile housing and extinguish the fire for training purposes.

When the training session has been completed, the panels 50, 52, 54 are shifted to their folded, transport positions to permit the training facility to be more easily transported to a new location. Suitable locking mechanisms may be coupled with the guide tracks 62, 70, 78 for locking the panels against the housing during transport.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

1. A fire fighting training facility comprising:
   a mobile housing having a plurality of exterior walls and an interior chamber therebetween;
   fire generating means coupled with the housing for generating a fire in the interior chamber of the housing; and
   a foldable extension panel attached to the exterior of the housing and shiftable between a folded, transport position wherein the panel overlies a portion of one of the exterior walls of the housing and an extended, use position wherein the panel is positioned adjacent to and substantially coplanar with another one of the exterior walls of the housing,
   the foldable extension panel having at least one surface resembling a portion of a facade of a stationary building so that the mobile housing resembles the stationary building when the panel is shifted to its extended, use position.

2. The fire fighting training facility as set forth in claim 1, the foldable extension panel being attached to the housing by a hinge and a guide track and slide assembly.

3. The fire fighting training facility as set forth in claim 1, further including smoke generating means coupled with the housing for generating smoke and for delivering the smoke to the interior chamber of the housing.

4. The fire fighting training facility as set forth in claim 3, further including a powered exhaust vent for venting the smoke from the interior chamber of the housing.

5. The fire fighting training facility as set forth in claim 1, the fire generating means including a fire box having a gas burner positioned in the interior chamber of the housing and a gas tank coupled with the fire box for delivering gas to the gas burner.

6. The fire fighting training facility as set forth in claim 5, further including a fire control panel coupled with the fire generating means for controlling the fire.

7. A fire fighting training facility comprising:
 a mobile housing including:
  front wall having a door therein and presenting opposed left and right side margins and opposed top and bottom margins,
  a rear wall having a towing tongue extending therefrom for coupling the housing to a towing vehicle,
  a pair of opposed left and right side walls,
  a top wall, and
  an interior chamber;
 fire generating means coupled with the housing for generating a fire in the interior chamber of the housing;
 a first foldable extension panel attached to the exterior of the mobile housing adjacent the left side margin of the front wall, the first foldable extension panel being shiftable between a folded, transport position wherein the panel extends substantially perpendicular to the front wall of the housing and overlies a portion of the left side wall, of the housing, and an extended, use position wherein the panel extends substantially parallel to and generally coplanar with the front wall of the housing;
 a second foldable extension panel attached to the exterior of the mobile housing adjacent the right side margin of the front wall, the second foldable extension panel being shiftable between a folded, transport position wherein the panel extends substantially perpendicular to the front wall of the housing and overlies a portion of the right side wall, and an extended, use position wherein the panel extends substantially parallel to and generally coplanar with the front wall of the housing;
 a third foldable extension panel attached to the exterior of the mobile housing adjacent the top margin of the front wall, the third foldable extension panel being shiftable between a folded, transport position wherein the panel extends substantially perpendicular to the front wall of the housing and overlies a portion of the top wall, and an extended, use position wherein the panel extends substantially parallel to and generally coplanar with the front wall of the housing;
 the first, second and third foldable panels each having at least one surface resembling a portion of a facade of a stationary building so that the mobile housing resembles the stationary building when the panels are shifted to their extended, use positions.

8. The fire fighting training facility as set forth in claim 7, the first, second and third foldable extension panels each being attached to the housing by hinges and guide track and slide assemblies.

9. The fire fighting training facility as set forth in claim 7, further including smoke generating means coupled with the housing for generating smoke and for delivering the smoke to the interior chamber of the housing.

10. The fire fighting training facility as set forth in claim 9, further including a powered exhaust vent for venting the smoke from the interior chamber of the housing.

11. The fire fighting training facility as set forth in claim 7, the fire generating means including a fire box having a gas burner positioned in the interior chamber of the housing and a gas tank coupled with the fire box for delivering gas to the gas burner.

12. The fire fighting training facility as set forth in claim 1, further including a fire control panel coupled with the fire generating means for controlling the fire.

* * * * *